United States Patent [19]

Engel

[11] 3,914,545

[45] Oct. 21, 1975

[54] AUTOMATIC CONTRAST CONTROL UTILIZING THREE CONTROL SIGNALS

[75] Inventor: Christopher M. Engel, Franklin Park, Ill.

[73] Assignee: Zenith Radio Corporation, Chicago, Ill.

[22] Filed: Sept. 9, 1974

[21] Appl. No.: 504,632

Related U.S. Application Data

[63] Continuation of Ser. No. 277,427, Aug. 2, 1972, abandoned.

[52] U.S. Cl. .......................... 178/7.5 R; 178/7.5 DC

[51] Int. Cl.[2] .......................................... H04N 5/58

[58] Field of Search .................. 358/21, 34, 39, 74; 178/7.3 R, 7.3 DC, 7.5 R, 7.5 DC

[56] References Cited

UNITED STATES PATENTS

| | | | |
|---|---|---|---|
| 2,937,235 | 5/1960 | Hoyt et al. | 178/7.3 DC |
| 3,437,750 | 4/1969 | Hedger et al. | 178/7.3 DC |
| 3,692,933 | 9/1972 | Knoll | 178/7.5 R |

*Primary Examiner*—Benedict V. Safourek
*Assistant Examiner*—George G. Stellar
*Attorney, Agent, or Firm*—Nicholas A. Camasto

[57] ABSTRACT

An automatic contrast control circuit in a color television receiver for stabilizing the average DC level of the luminance information at a desired level and preventing focus blooming. The control circuitry, which is suitable for fabrication as a monolithic integrated circuit, contemplates the provision of a gain-controlled luminance amplifier stage for driving an image reproducer with luminance information having a stabilized black level. An average detector coupled to the amplifier stage output develops a control signal representative of the average DC level of the luminance information and applies it to the amplifier stage, varying its gain inversely with changes in the average luminance level. A peak limiter circuit is also provided for modifying the control signal to reduce the amplifier stage's gain whenever an AC brightness component comprising the luminance information exceeds a defined threshold level, regardless of the average DC level of the luminance information.

11 Claims, 3 Drawing Figures

AUTOMATIC CONTRAST CONTROL UTILIZING THREE CONTROL SIGNALS

RELATED APPLICATION

This application is a continuation of copending application Ser. No. 277,427, filed Aug. 2, 1972 now abandoned.

BACKGROUND OF THE INVENTION

This invention relates in general to control circuitry for color television receivers and more particularly to an automatic contrast control circuit incorporated in the luminance processing channel. In accordance therewith, a variable DC control signal is derived from the luminance signal information as a function of the average luminance level. The DC control signal is applied to a gain-controlled amplifier stage in the luminance channel, varying its gain and thereby insuring that excessive beam currents will not be generated due to high average luminance levels. Conversely, the circuit is effective to increase the gain of the amplifier stage when under-modulated signals are received thereby providing the desired contrast level. When the white content of the instantaneous received signal exceeds a predetermined level, however, the DC control signal is modified to reflect the excessive white content even though the average luminance level may be low. Accordingly, the amplifier stage's gain is reduced to prevent defocusing.

In color television receivers, the various elemental areas of differing brightness levels, or shades, in the televised image correspond to the amplitude levels of the instantaneous brightness components of the luminance signals which, together with the chrominance signal, reproduce the transmitted picture information on the image display tube. The intensity of the electron beams developed in the receiver's image display tube are varied, for the most part, according to the detected amplitude levels of the instantaneous luminance signals. Accordingly, progressively higher amplitude levels generate higher intensity electron beams and, consequently, progressively lighter shades. In addition, suitable viewer-adjustable controls are customarily provided in the television receiver whereby a particularized contrast and brightness setting may be selected according to viewer preference.

It is desirable that the level of the luminance signal component corresponding to black in the televised image be maintained at the cut-off of the image reproducer. But even in those instances where there is a measure of DC coupling, the DC components of the luminance signal coupled from the video detector to the luminance channel may be degraded or otherwise restricted due to the nature of the processing circuitry as well as to other factors. Moreover, the luminance processing channel itself may well permit a degradation or undesirable shift in the desired DC characteristics. The result is that the DC level in the processed luminance signal is not properly maintained, such that, upon application to the image display tube, the black level is shifted to some undesirable reference. This leads to less than faithful half-tone reproduction on the screen of the image display tube. Gray tones can be lost simply because they are beyond the cut-off of the display tube. In other instances, blacks may appear as grays on the image display tube screen.

Thus, it is desirable to make provision for the maintenance of black level in the televised image at some stabilized reference. Various systems are of course known in the art for accomplishing this objective and take various forms and configurations. For example, an arrangement commonly known as a DC restorer circuit which includes a clamping device may be employed. However, when the black level is effectively stabilized at the image reproducer's cut-off bias point, the average level of the luminance signal information may reach the point where excessive average beam currents capable of severely damaging the image reproducer are generated. In addition, the high voltage power supply during instances of high beam current may be incapable of delivering the required beam current. Such overloading reduces the power supply output voltage and results in undesirable "focus blooming." That is, there will be a loss of brightness, reduction of horizontal widths and severe defocusing of the reproduced image. The problem in this regard has been further compounded by the "new generation" high-brightness cathode-ray tubes which require higher beam currents in order to illuminate the tube to its fullest capability during high-modulation (white) scenes. In view of the added demands on the high voltage power supply and the danger of damaging the image display tube, some method for effectively limiting the beam current is required.

Accordingly, automatic contrast control systems have been developed which reduce the gain of the luminance amplifier stage to prevent the generation of excessive beam currents or increase the gain when under-modulated signals are received. Most of these prior art automatic contrast control systems, however, measure only the average level of the luminance signals to derive the control signal utilized to vary the gain of the luminance amplifier. Consequently, when all or a major portion of the luminance signal's white content is of a high amplitude level and is concentrated on a very small portion of the image reproducer's screen, the control signal derived from the average luminance level is low, permitting the luminance amplifier stage to operate at nearly maximum gain. By concentrating the high-amplitude white content into a small area of the screen, the image display tube is likely to be overdriven during that period of time and "focus blooming" will result. Some automatic contrast systems, on the other hand, derive a control signal based on the peak amplitudes of the instantaneous luminance signals without regard to the average luminance level. Thus, while preventing blooming on high-amplitude white content, such systems are susceptible to luminance signals which have a dangerously high average level, but do not have any peak white signal content of a level where the system would take corrective action.

OBJECTS OF THE INVENTION

Accordingly, it is an object of the present invention to provide a color television receiver having black level stabilization with a new and improved automatic contrast control circuit which effectively overcomes the aforenoted disadvantages and deficiencies of prior circuits.

A further object of the invention is to provide an improved automatic contrast control circuit which develops control signals effectively varying the gain of a luminance amplifier stage to maintain an optimum contrast, while preventing the generation of excessive beam currents in the cathode-ray tube.

A more particular object of the invention is to provide an improved automatic contrast control circuit for continuously monitoring the average (DC) level of the luminance signal information and providing a control signal representative thereof to vary the gain of a luminance amplifier stage while remaining sensitive to the amplitude levels of brightness components exceeding a threshold level and modifying the control signal in accordance therewith.

Another object of the invention is to provide an improved automatic contrast control circuit which increases the gain of a luminance amplifier stage during reception of undermodulated luminance signals.

A further object of the present invention is to provide an automatic contrast control circuit of the foregoing type for deriving a variable DC control potential from applied luminance signals which, upon application to the luminance channel, adjusts the gain of a luminance amplifier stage in accordance with the varying luminance signal requirements.

Still another object of the invention is to provide a luminance processing channel including automatic contrast control circuitry which may be fabricated as a monolithic integrated circuit to provide an output luminance signal having stabilized black level and optimum contrast without producing excessive beam currents.

SUMMARY OF THE INVENTION

In accordance with the present invention, an improved automatic contrast control circuit is provided for varying the gain of an amplifier stage in the luminance processing channel of a color television receiver whenever the average DC level of the input luminance information varies from a desired level, or whenever the peak amplitudes of the AC brightness components of the luminance information exceed a predetermined threshhold level. In a preferred embodiment, the automatic contrast control circuit includes a gain-controlled luminance amplifier stage in a luminance processing channel for translating instantaneous luminance signals derived from received broadcast transmissions to an image reproducer. The amplified luminance signals found at the output of the amplifier stage have a stabilized black level. There are also provided detector means coupled to the amplifier output for developing control signals that are representative of the average DC level of the instantaneous luminance signals. The control signals are then applied to the gain-controlled amplifier stage to vary its gain inversely with changes in the average luminance level. Finally, peak limiter means are coupled between the amplifier output and the detector means to modify the control signals whenever the instantaneous luminance signals exceed a threshhold level. The modified control signals are similarly utilized to effect inverse gain variations in the gain-controlled amplifier stage regardless of the average level of the luminance signals.

BRIEF DESCRIPTION OF THE DRAWINGS

The features of this invention which are believed to be novel are set forth with particularity in the appended claims. The invention, together with its further objects and advantages thereof, may be best understood, however, by reference to the following description taken in conjunction with the accompanying drawings, in which like reference numerals refer to like elements in the several figures and in which:

DESCRIPTION OF THE PREFERRED EMBODIMENT

Figure 1:
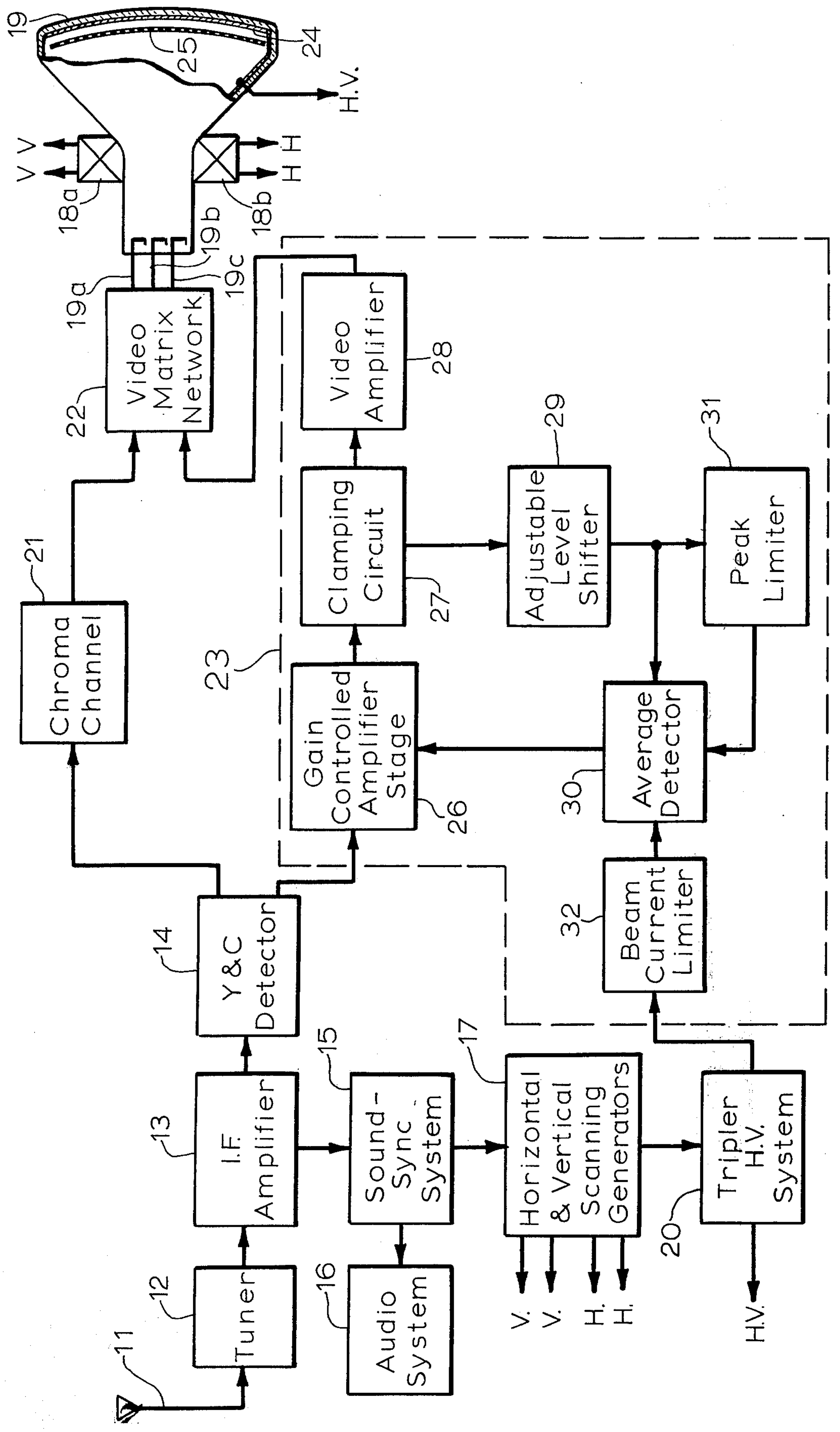
FIG. 1 is a block diagram of a television receiver which includes automatic contrast control circuitry in accordance with one embodiment of the invention.

Referring now to FIG. 1, a color television receiver is shown which incorporates automatic contrast control circuitry in accordance with the present invention. The receiver includes an antenna 11 which intercepts telecast signals and couples them to an input tuner stage 12 where a particular received signal is selected, amplified and converted to an intermediate frequency in the well-known manner. The amplified and converted signal is then coupled to an intermediate-frequency (IF) and amplifier 13 where it is further amplified and coupled to a luminance (Y) and chrominance (C) detector 14, and also to a sound-sync system 15. Sound-sync system 15, in turn, connects to an audio system 16 having appropriate circuitry for reproducing the audio portion of the received signal. Sound-sync system 15 further connects to horizontal and vertical scanning generators 17 wherein the usual circuitry is included for developing horizontal (line) and vertical (field) deflection signals which are applied to appropriate deflection yokes **18*a* and 18*b* positioned about a cathode-ray tube 19 serving as the image reproducer or picture tube. The horizontal and vertical scanning generators 17 further connect to a voltage multiplier high-voltage system 20, more commonly known as a tripler, wherein a high-voltage accelerating potential is developed for application to the image reproducer 19**.

The detected chrominance information from Y & C detector 14 is connected to a chroma channel 21 which develops the chrominance signals R-Y, B-Y and G-Y that are applied to the video matrix network 22 as one of the informational inputs thereto. The detected luminance information from detector 14 is similarly connected to a luminance channel, identified generally by dashed line box 23, the details of which will be more fully explained hereinafter. The processed luminance (Y) signals are applied to the video matrix network 22 such that signals containing the correct brightness, hue and color saturation information are derived and applied to the appropriate control electrodes of the cathode-ray tube 19 in a manner understood in the art. In the embodiment of the receiver as herein shown, the color signals R, G and B developed by video matrix network 22 are applied directly to the cathodes **19*a*, 19*b* and 19*c*, respectively, of the cathode-ray tube 19**.

The image reproducer 19, which for illustrative purposes only, is shown to be a conventional shadow mask picture tube, includes a tri-color image screen or target 24 to be scanned by a group of three electron beams developed by individual guns housed within the tube itself. A parallax mask 25 is included in the color tube 19 to restrict the electron beams generated in the guns in a known manner so that each beam is permitted to impinge only upon phosphor dots of a single color on image screen 24. The electron beams are suitably modulated by the luminance and chrominance information such that their traverse of screen 24 under the influence of the deflection fields generated by the deflection yokes 18*a* and 18*b* results in the production of a visual image. Since the parallax or shadow mask 25 enables each electron beam to see but a single color phosphor on its traverse of screen 24, the reproduction is, in fact, that of three image fields effectively superposed to yield an image in simulated natural color. The remaining components of the tube, including the convergence yoke and the electron lens system, have been omitted as they form no part of the subject matter proper of the present invention and because the details of such remaining structure and components, as well as the operation thereof, are well known in the art.

As thus far described, the receiver is conventional in general construction and operation such that further and more particular description should not be necessary. More particular consideration, however, may now be given to that portion of the receiver which relates to the preferred embodiment of the present invention, and in general constitutes automatic contrast control circuitry in conjunction with the luminance channel, identified generally at 23.

More particularly, luminance information from the Y & C detector 14 is coupled to a gain-controlled amplifier stage 26 where it is amplified and subsequently applied to a clamping circuit 27. There, the luminance information's black level is stabilized at a predetermined level by clamping the portion of the synchronizing signal component known as the "backporch" at a fixed reference potential. Since true black level very nearly coincides with the backporch, this is a most acceptable design approximation, and hereinafter reference to "black level" shall be synonomous with "backporch", and vice versa. The luminance information with its stabilized black level is then DC coupled to a video amplifier 28 where it is further amplified and processed prior to its application as the second informational input to the video matrix network 22. Ideally, the reference potential at which black level is clamped will coincide with the cut-off potential of the cathode-ray tube 19 thereby insuring faithful half-tone reproduction of the image on the cathode-ray tube screen 24. The black level stabilized luminance signals from clamping circuit 27 are also coupled to an adjustable level shifter 29 which serves as a contrast control.

In accordance with the present invention, the black level stabilized signal is coupled from the adjustable level shifter 29 to an average detector 30 which, in turn, develops a control signal representative of the average level of the luminance information, or more specifically, the average DC voltage level of the brightness components comprising the luminance information. This control signal is then applied to the gain-controlled amplifier stage 26, completing a closed-loop feedback arrangement. That is, when the average level of the luminance information shifts away from a desired level, or norm, due to changes in picture content, the resultant control signal produced by the average detector 30 varies the bias applied to the gain-controlled amplifier stage 26, returning the average luminance level to the desired norm by increasing or decreasing the gain as the particular case may require. For example, when the average luminance level increases responsive to increasing white picture content, the gain of the amplifier stage 26 is reduced to force the average level of the output luminance information back to the norm. Conversely, when the average luminance level falls below the desired norm, the control signal from the average detector 30 biases the amplifier stage 26 to a higher gain condition. This increases the peak-to-peak amplitude of the output luminance signals, returning the average luminance level to the desired average level.

There are instances, though, when all of the luminance signal's white content is concentrated into a small area of the cathode-ray tube screen so that the average luminance level may be at or below the desired norm. The average detector 30, however, can only detect changes in the average luminance level, and consequently, the resultant control signals derived from detector 30 may increase the gain of the gain-controlled amplifier stage 26 when, in actuality, the high amplitude white components are already causing focus blooming. A peak limiter 31 is coupled between the adjustable level shifter 29 and the average detector 30 to modify the control signal whenever the peak white components of the luminance signals exceed a certain predetermined threshold level. That is, although the control signal from the average detector 30 would normally increase the gain of the gain-controlled amplifier stage 26 due to the low average luminance level, the peak limiter 31 may modify the control signal to actually reduce the gain whenever the peak white components reach excessive levels, thereby preventing focus blooming.

Finally, a beam current limiter 32 is coupled to the tripler high-voltage system 20 to monitor the amplitude of pulses found therein which are directly proportional to the beam current generated in the cathode-ray tube 19. These charging pulses which coincide with the sync intervals of the luminance signals have amplitudes directly proportional to the beam current developed during the previous horizontal line. The beam current limiter 32 responsive to the charging pulses further modifies the control signal developed by the average detector 30 to reflect the amount of beam current generated in the cathode-ray tube. Although it would appear that the beam current limiter 32 serves the same purpose as the average detector 30, i.e., measuring the average luminance level, it should be noted that the average detector 30 derives its input luminance signal from the adjustable level shifter 29. Thus, when the viewer manually adjusts the contrast to maximum, the desired average level, or norm, may in fact be shifted past a safe level. Similarly, brightness control adjustments may have the same effect. Accordingly, the beam current limiter 32 acts to prevent this.

Figures 2, 3:
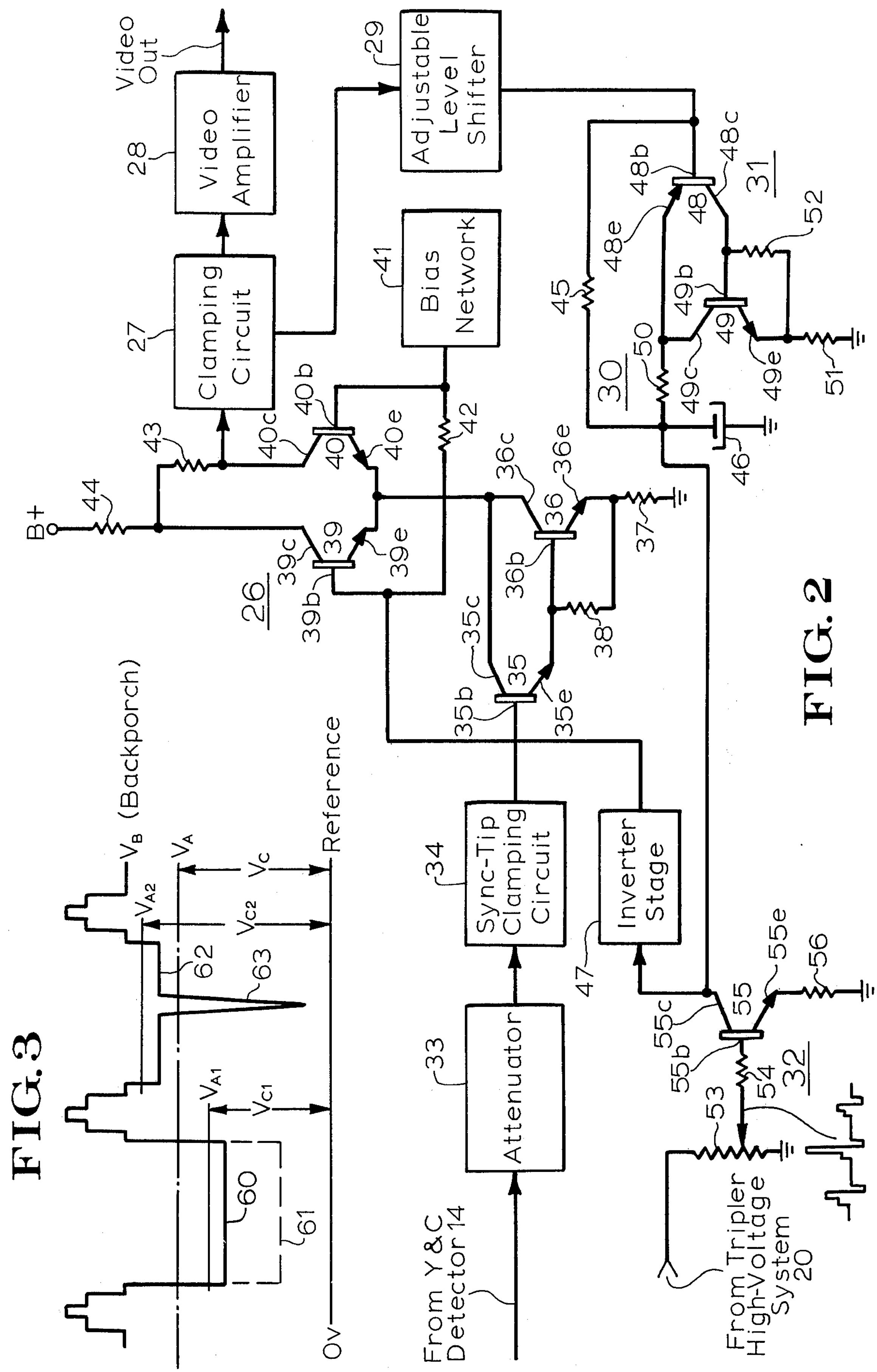
FIG. 2 is a combined schematic and block diagram of the luminance processing channel in a television receiver incorporating the present invention.
FIG. 3 is a representation of various luminance signal waveforms employed in describing operational characteristics of the television receiver.

The luminance processing channel 23 embodying the automatic contrast control system of the present invention is shown in greater detail in FIG. 2. Therein, luminance information from the second video detector (i.e., Y & C detector 14 of FIG. 1) is coupled to an attenuator 33 where it is reduced to an amplitude level that is suitable for driving a differential amplifier comprising the gain-controlled amplifier stage, identified generally as 26. By reducing the peak-to-peak amplitude excursions of the luminance information's brightness components from several volts to the millivolt range, the differential amplifier can be operated over a linear portion of its range. The attenuated luminance information is then passed to a sync-tip clamping circuit 34 which clamps the tips of its synchronizing pulses at a preselected reference potential. Thus, the linear amplification range required of the differential amplifier is further reduced because the amplitude excursions to be amplified vary in only one direction from the amplifier's quiescent operating point when sync-tips are stabilized at that point. This is not the case where the average level corresponds to the quiescent point so that luminance information may be found on either side of the operating point thereby requiring a larger linear amplification range.

Thereafter, the luminance information is coupled to the base electrode **35*b* of a first transistor 35 which, together with a second transistor 36, comprises the driver stage for the differential amplifier of the gain-controlled amplifier stage 26. Transistors 35 and 36 are interconnected in a Darlington configuration to present a high input impedance to the applied luminance signals. Accordingly, the emitter electrode 35*e* of transistor 35 is coupled to the base electrode 36*b* of transistor 36, while its collector electrode 35*c* is connected to the collector electrode 36*c* of transistor 36. The emitter electrode 36*e* is coupled to ground through a resistor 37 and is further coupled to the junction of emitter electrode 35*e* and its own base electrode 36*b* by another resistor 38 which provides the well-known "bootstrapping" action. The driver stage applies the luminance-modulated current developed at collector electrodes 35*c*, 36*c* to the interconnected emitter electrodes 39*e*, 40*e* of two transistors 39, 40, respectively, comprising the differential amplifier. The driver stage and the differential amplifier combine to form the gain-controlled amplifier stage 26. A bias network 41 applies the proper bias potential to base electrode 40*b* while resistor 42 couples part of that bias to base electrode 39*b*. The collector electrode 40*c* of transistor 40 is coupled to a source of operating potential (B+) by two series-connected resistors 43 and 44. Transistor 39 derives its operating potential from the junction of resistors 43, 44 which is directly connected to its collector electrode 39*c*.**

Operationally, transistors 39 and 40 are biased such that during normal operation a portion of the luminance-modulated current is conducted through transistor 40 while the remainder is shunted through transistor 39. The collector electrode **40*c* serves as the output of the gain-controlled amplifier stage 26, and the amplified luminance signals found at that point are coupled to the clamping circuit 27** where, as previously mentioned, black level is stabilized at a predetermined reference potential to insure that the transmitted image will be faithfully reproduced with correct half tones.

The black level stabilized luminance signals are subsequently coupled to a video amplifier 28 where they are further amplified and processed prior to application to the video matrix network 22 shown in FIG. 1. The black level stabilized luminance signals are also applied to the adjustable level shifter 29 which, as previously mentioned, functions as an adjustable contrast control. Thus, the peak-to-peak amplitude levels of the AC brightness components may be adjusted to provide the desired contrast in the reproduction of the transmitted image.

In one embodiment of the present invention, the black level stabilized luminance information is coupled through a resistor 45 to charge a capacitor 46 the other end of which is connected directly to a plane of reference potential, shown here to be ground. Together, resistor 45 and capacitor 46 function as an average detector which develops a control voltage across capacitor 46 that is representative of the average (DC) luminance level of the instantaneous luminance signals applied to it.

The development of the control voltage and its relationship to the average luminance level may be better understood by reference to FIG. 3. There it is shown that the control voltage ($V_C$) developed by the average detector is equal to the DC reference potential ($V_B$) at which black level is stabilized minus the DC potential ($V_A$) corresponding to the average luminance level of the received signals. For example, when the viewer adjusts the contrast to a desired level, a reference potential or norm, ($V_A$) will be defined. Accordingly, luminance signals having an average luminance level coinciding with $V_A$ will not cause an increase or decrease in the control voltage that will change the gain of the gain-controlled amplifier stage 26. Typically, the defined norm will coincide with the average luminance level of an "intermediate" luminance signal; that is, one which, for "live" broadcast signals, comprises nearly equal amounts of peak white and black brightness components together with shades in between. For purposes of illustration in FIG. 3, however, the intermediate luminance signal 60 is shown to be that which would produce a solid gray raster on the cathode-ray tube screen. Since the average luminance level of the intermediate signal coincides with the norm $V_A$, the gain of amplifier stage 26 will be unchanged. Dashed-line luminance signal 61, however, typifies a solid peak-white raster with an average luminance level $V_{A1}$. Consequently, the control voltage $V_{C1}$ developed by the average detector 30 will decrease due to the shift in the average luminance level. Conversely, the average luminance level $V_{A2}$ of a low-level luminance signal 62, ignoring peak brightness component 63 for the present, generates a control signal which increases the gain of amplifier stage 26.

The control voltage ($V_C$) generated in response to the luminance signals is then coupled to an inverter stage 47 which inverts the DC control signal such that when the control voltage $V_C$ decreases due to increased average luminance levels, the processed control signal at the output of inverter stage 47 actually increases, and vice versa. The control signals are then applied to the base electrode **39*b* and through resistor 42 to base electrode 40*b* of transistors 39 and 40, respectively. Accordingly, the biases on base electrodes 39*b* and 40*b* are varied to redetermine what portion of the luminance-modulated current flows through each transistor. The result is that the average luminance level of the luminance signals found at the output (collector electrode 40*c*) of the gain-controlled amplifier stage 26** remains nearly constant.

For example, when an intermediate luminance signal is followed by a "high" average luminance level signal, the gain-controlled amplifier stage 26 is conditioned to lower gain. Conversely, when the average luminance level decreases, the resultant control voltage applied to amplifier stage 26 increases its gain.

As previously noted, on occasion the brightness components, or white content, of the luminance signals may be concentrated into a very small area on the cathode-ray tube screen. Thus, even though the average luminance level may be somewhat lower than the norm, as is the case with luminance signal 62 in FIG. 3, the peak brightness component 63 may have such a high amplitude that focus blooming would result. Accordingly, a peak limiter circuit 31 (FIG. 1) is associated with the average detector 30 to prevent amplification of the high-amplitude white information due to the control signal resulting from low average luminance level. The peak limiter 31 includes a network, comprising transistors 48 and 49, which parallels resistor 45 of the average detector 30. Black level stabilized luminance signals are coupled to the base electrode 48*b* of the PNP transistor 48 from the adjustable level shifter 29. Its emitter electrode 48*e* is coupled through a resistor 50 to the junction of resistor 45 and capacitor 46. Collector electrode 48*c* is connected directly to the base electrode 49*b* of transistor 49, which, in turn, has a collector electrode 49*c* connected to the emitter electrode 48*e*. The emitter electrode 49*e* of transistor 49 is returned to ground through a resistor 51, and another resistor 52 connects emitter electrode 49*e* to its base electrode 49*b* and collector electrode 48*c*.

Electrically, this network functions as a simple PNP transistor having its emitter electrode coupled to the junction of resistor 45 and capacitor 46, its collector electrode connected direct to ground, and its base electrode coupled to the adjustable level shifter 29. Thus, when the brightness components of the luminance signal coupled to base electrode 48*b* exceed a threshold level corresponding to the base-emitter junction breakdown voltage which is, in turn, referenced to the control voltage $V_C$ (FIG. 3) at the junction of resistor 45 and capacitor 46, transistor 48 is driven to conduction. Transistor 49 then becomes operative to provide a low impedance discharge path for capacitor 46. Accordingly, when there is a high-amplitude peak white signal exceeding the threshold, such as component 63 in FIG. 3, the peak limiter 31 modifies the control voltage $V_C$ by discharging capacitor 46. The time that peak limiter 31 functions to discharge capacitor 46 is determined by the duty cycle of the peak white signals as measured at the threshold level. Thus, even though the average luminance level may be minimal, (corresponding to a nearly black scene) thereby tending to bias the gain-controlled amplifier stage 26 to a high gain condition, the peak limiter 31 is effective to "bleed" some of the charge from capacitor 46 to reduce the control voltage $V_C$ and actually decrease the gain of amplifier stage 26. If, however, the average luminance level is already high such that the control voltage will reduce the gain, the peak limiter 31 will discharge capacitor 46 even further, providing for additional corrective action.

A beam current limiter 32 is also included to modify the control voltage ($V_C$) in accordance with the average beam current generated by the cathode-ray tube. This additional circuitry is required, because the adjustable level shifter 29 may be adjusted by the viewer to contrast levels beyond safety tolerances of the cathode-ray tube. Beam current limiter 32 measures the amplitude of brightness-dependent pulses (FIG. 2) associated with the tripler high-voltage system 20. The pulses' amplitudes which are a function of the beam current actually developed in the cathode-ray tube increase in amplitude as increasing beam current is generated. Thus, by setting a maximum beam current threshold, the beam current limiter 32 may be utilized to modify the control voltage ($V_C$). Operationally, pulses from the tripler high-voltage system 20 are coupled through potentiometer 53 and resistor 54 to the base electrode 55*b* of the beam current limiter transistor 55. Resistor 56 couples the emitter electrode 55*e* to ground while the collector electrode 55*c* is coupled directly to the junction of resistor 45 and capacitor 46. Whenever the brightness-dependent pulses exceed the base-emitter junction breakdown voltage, transistor 55 is activated to provide an alternate discharge path for capacitor 46, decreasing the control voltage. Thus, by adjusting potentiometer 53, a maximum beam current limiter 32 may be utilized to modify control signal $V_C$ and, accordingly, the gain of amplifier stage 26.

Thus, the automatic contrast control circuitry of the preferred embodiment is effective to generate a control signal for varying the gain of a gain-controlled luminance amplifier stage to maintain optimum contrast in the reproduced image while preventing the development of excessive beam currents in the cathode-ray tube. Unlike prior art systems which generally measure only the average DC level of the brightness components, the present embodiment effectively provides an average luminance level automatic contrast control system which, in addition, reacts to peak white luminance information exceeding a threshold value. Consequently, the present invention is also effective to prevent focus blooming on peak white luminance information. Furthermore, a major portion of the automatic contrast control circuit of the present invention has been designed for fabrication as a monolithic integrated circuit.

While a particular embodiment of the present invention has been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

What is claimed is:

1. In a television receiver having a luminance processing channel for translating instantaneous luminance signals derived from received broadcast transmissions to an image reproducer, said luminance signals including black level reference information, an automatic contrast control circuit comprising in combination:

a gain-controlled luminance amplifier stage having an input, and an output coupled to said image reproducer;

clamping means coupled to the output of said stage for stabilizing the black level of said luminance signals at a reference level;

automatic brightness means including average detector means having an input coupled to said amplifier stage and to said clamping means for receiving said luminance signals and developing therefrom control signals representative of the average DC level of said luminance signals, and an output for feeding back said control signals to said amplifier stage to vary its gain inversely with changes in the average DC level;

beam current limiter means coupled to said average detector means for monitoring and limiting the beam current developed in said image reproducer; and peak detector means having an input coupled to said clamping means for receiving said luminance signals and an output coupled to said average detector means for modifying said control signals whenever the brightness components of said luminance signals exceed a threshold level to effect overriding inverse gain variations for said amplifier stage irrespective of the average DC level of said luminance signals.

2. An automatic contrast control circuit in accordance with claim 1, wherein adjustable level shifting means are interposed between said amplifier stage and said average detector means, said adjustable level shifting means providing a contrast control for manually varying the average DC level of said luminance signals.

3. An automatic contrast control circuit in accordance with claim 1, wherein said average detector means includes a capacitor having an output terminal coupled to said amplifier stage and a second terminal coupled to a plane of reference potential, said capacitor being charged by luminance signals from said amplifier stage and developing control signals representative of the average DC level of said luminance signals.

4. An automatic contrast control circuit in accordance with claim 3, wherein said control signals with respect to a plane of reference potential are equal to the potential at which black level is stabilized minus the potential drop between black level and the average DC level of said luminance information, said control signal increasing with respect to said plane of reference potential responsive to decreasing average DC levels of said luminance signals and decreasing responsive to increasing average DC levels.

5. An automatic contrast control circuit in accordance with claim 3, wherein said peak detector means includes a semi-conductor arrangement for providing said capacitor with a low impedance discharge path whenever said brightness components exceed a predetermined threshold level, the impedance of said discharge path being dependent on the amplitude of said brightness components and the discharge interval of said semiconductor arrangement being the time period during which said brightness components exceed said threshold level, said semiconductor arrangement further decreasing said control signals with respect to said plane of reference potential irrespective of the average DC level of said luminance signals.

6. An automatic contrast control circuit in accordance with claim 5, wherein said semiconductor arrangement comprises first and second transistors, said luminance signals from said amplifier stage being coupled to the input base electrode of said first transistor, said first transistor further having an emitter electrode coupled to said capacitor output terminal and a collector electrode coupled to the base electrode of said second transistor, said second transistor having a collector electrode coupled to said capacitor output terminal and an emitter electrode coupled to said plane of reference potential, said semiconductor arrangement being conductive to provide said capacitor with a low impedance discharge path whenever said brightness components exceed the base-emitter junction breakdown voltage of said first transistor.

7. An automatic contrast control circuit in accordance with claim 6, wherein said gain-controlled luminance amplifier stage includes a pair of transistors arranged in a differential amplifier configuration, the gain of which is dependent on the bias applied to the base electrodes of said transistors.

8. An automatic contrast control circuit in accordance with claim 7, wherein inverter means invert and couple said control signals to said base electrodes in said amplifier stage, the inverted control signals increasing the gain of said amplifier stage whenever the average DC level of said luminance signals decreases and decreasing the gain of said amplifier stage whenever the average DC level of said luminance information increases or whenever said brightness components exceed said threshold level.

9. An automatic contrast control circuit in accordance with claim 3, wherein said beam current limiter means provide a low impedance discharge path for said capacitor whenever the beam current exceeds a predetermined level.

10. An automatic contrast control system in accordance with claim 9, wherein said beam current limiter means monitors pulses from a voltage multiplier high-voltage system, said pulses being proportional to the beam current generated during the previous horizontal scan line.

11. An automatic contrast control circuit in accordance with claim 10, wherein said beam current limiter means comprises a transistor having a base electrode coupled to said voltage multiplier high-voltage system, an emitter electrode coupled to a plane of reference potential and a collector electrode coupled to said capacitor, said transistor providing a low impedance discharge path whenever said pulses exceed the base-emitter junction breakdown voltage of said transistor.

* * * * *